United States Patent [19]

Hashimoto et al.

[11] 4,192,452
[45] Mar. 11, 1980

[54] INFORMATION READING SYSTEM

[75] Inventors: Tsutomu Hashimoto; Nobuhiro Nakamura, both of Amagasaki, Japan

[73] Assignee: Mitsubishi Denki Kabushiki Kaisha, Japan

[21] Appl. No.: 770,074

[22] Filed: Feb. 18, 1977

[30] Foreign Application Priority Data

| Feb. 20, 1976 | [JP] | Japan | 51-17744 |
| Feb. 23, 1976 | [JP] | Japan | 51-18686 |
| Mar. 15, 1976 | [JP] | Japan | 51-27954 |
| Mar. 15, 1976 | [JP] | Japan | 51-27955 |
| Mar. 15, 1976 | [JP] | Japan | 51-27956 |
| Mar. 15, 1976 | [JP] | Japan | 51-27958 |

[51] Int. Cl.² .................. G06K 7/10; H04M 5/38
[52] U.S. Cl. ................................. 235/471; 235/455
[58] Field of Search ............. 358/223; 235/455, 462, 235/471

[56] References Cited

U.S. PATENT DOCUMENTS

| 3,499,109 | 3/1970 | Kihara et al. | 358/223 |
| 3,678,195 | 7/1972 | Dillenburger | 358/223 |
| 3,683,108 | 8/1972 | Pieters | 358/223 |
| 3,873,812 | 3/1975 | Stein et al. | 235/61.11 E |
| 3,969,612 | 7/1976 | McJohnson | 235/61.11 E |
| 3,988,573 | 10/1976 | Hayosh et al. | 235/61.11 E |
| 4,044,227 | 8/1977 | Holm et al. | 235/61.11 E |

*Primary Examiner*—Vincent P. Canney
*Attorney, Agent, or Firm*—Robert E. Burns; Emmanuel J. Loboto; Bruce L. Adams

[57] ABSTRACT

A television camera for picking up a bar coded label is controlled to produce scanning lines contacting each other as by halving its vertical sync frequency, producing an elliptical beam, alternating narrow beams with wide beam, or utilizing wobbling technique. Also a raster formed of the scanning lines is stepwise rotated by a pulse motor. Alternatively a pair of horizontal and vertical deflection coils disposed in quadrature relationship with the other pair of similar coils are supplied with sawtoothed deflection currents varying in amplitude at predetermined equal intervals and in quadrature relationship with similar current supplied to the other coil pair. For spaced scanning lines, a video signal from the television camera affected by its after-images is blocked by a gate. Alternatively, the signal is subtracted from a video signal due to the preceding scanning line correlative to the same to remove the effect of the after-images.

8 Claims, 26 Drawing Figures

FIG. 1A
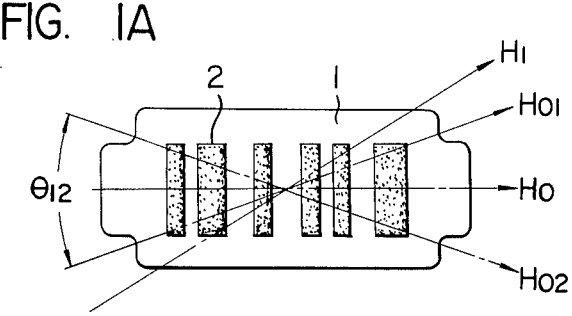
FIG. 1B
FIG. 1C
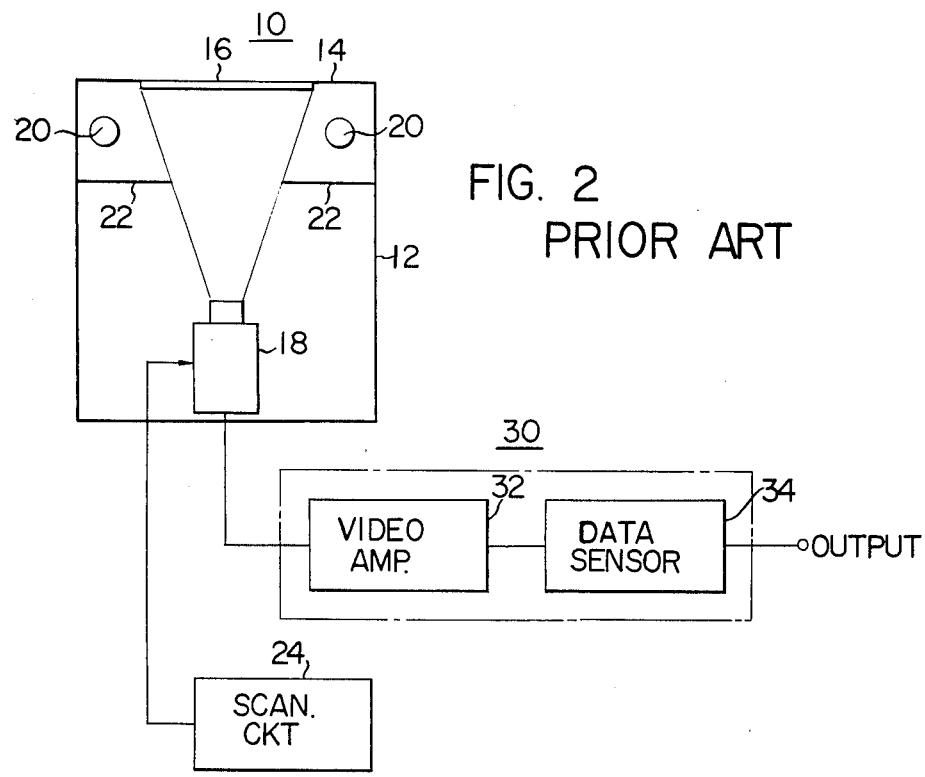
FIG. 2
PRIOR ART

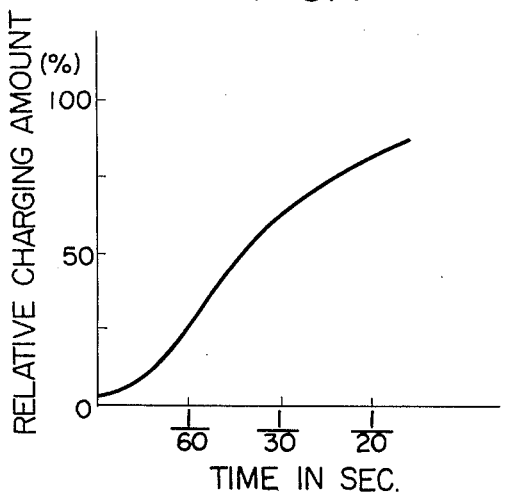
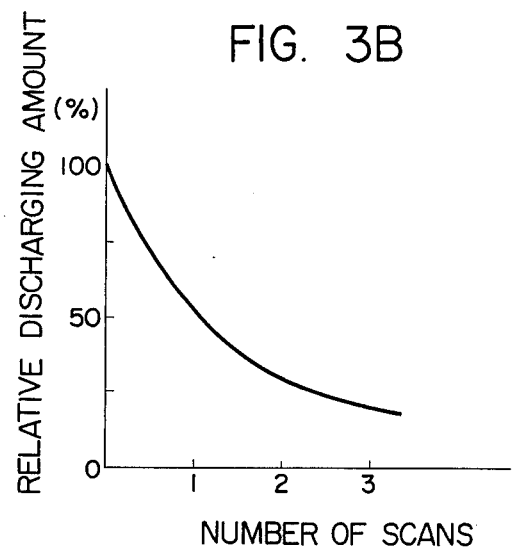
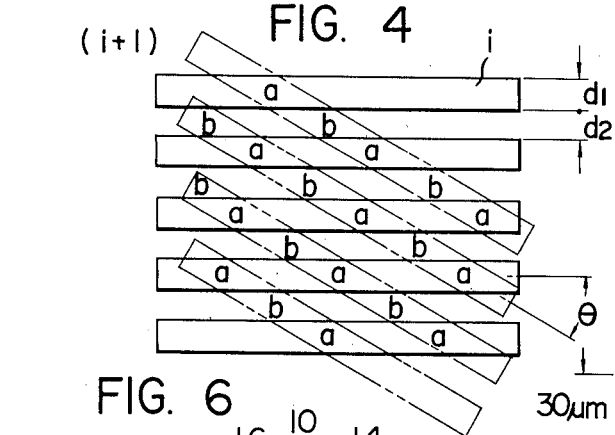
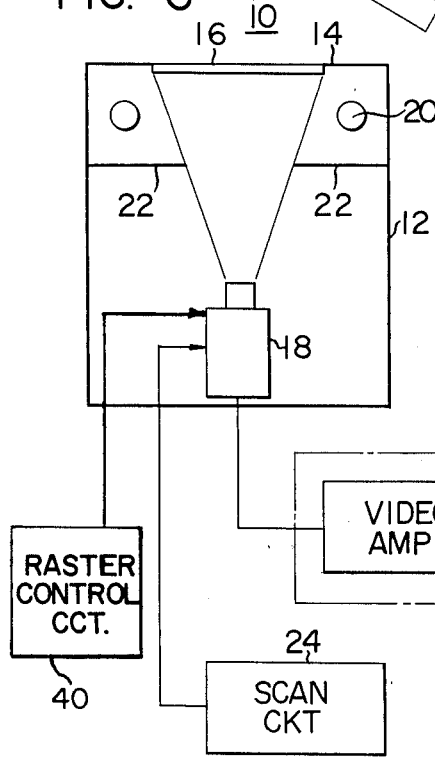
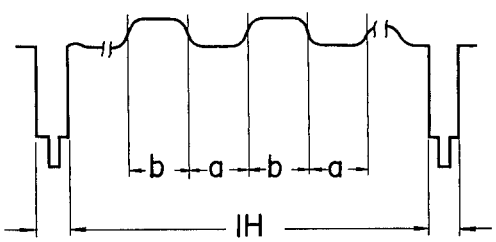
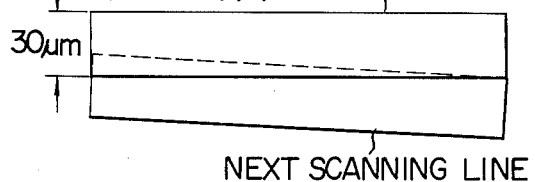
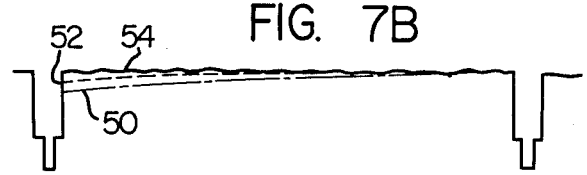
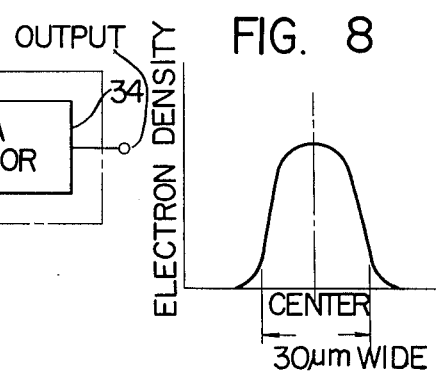

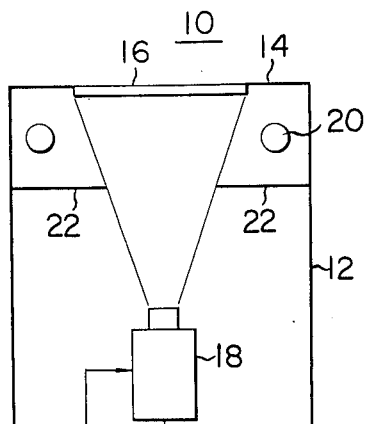
FIG. 9
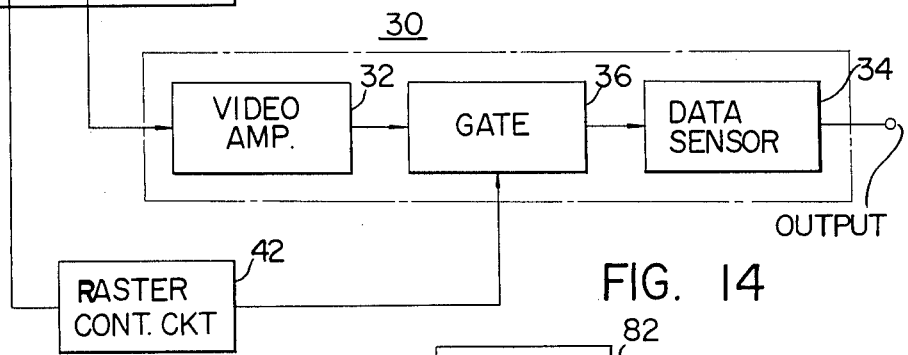
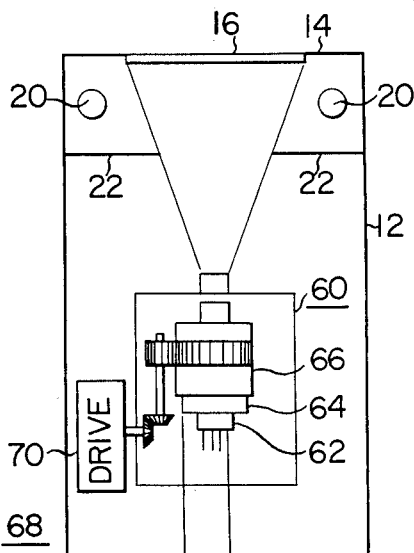
FIG. 10
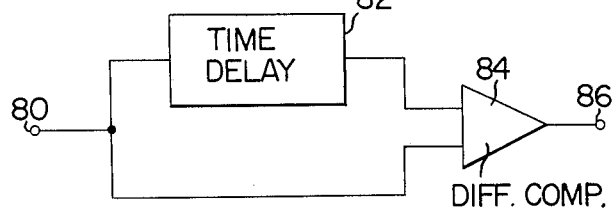
FIG. 14
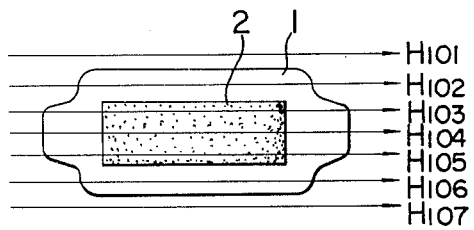
FIG. 15
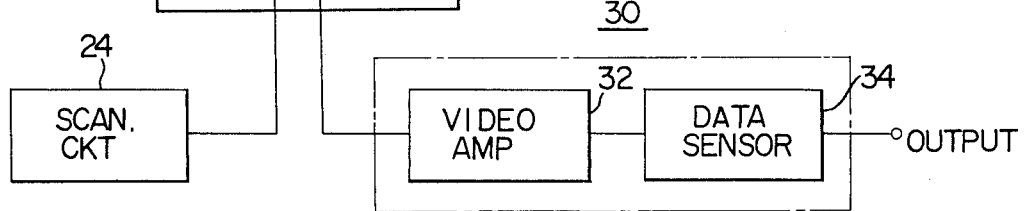

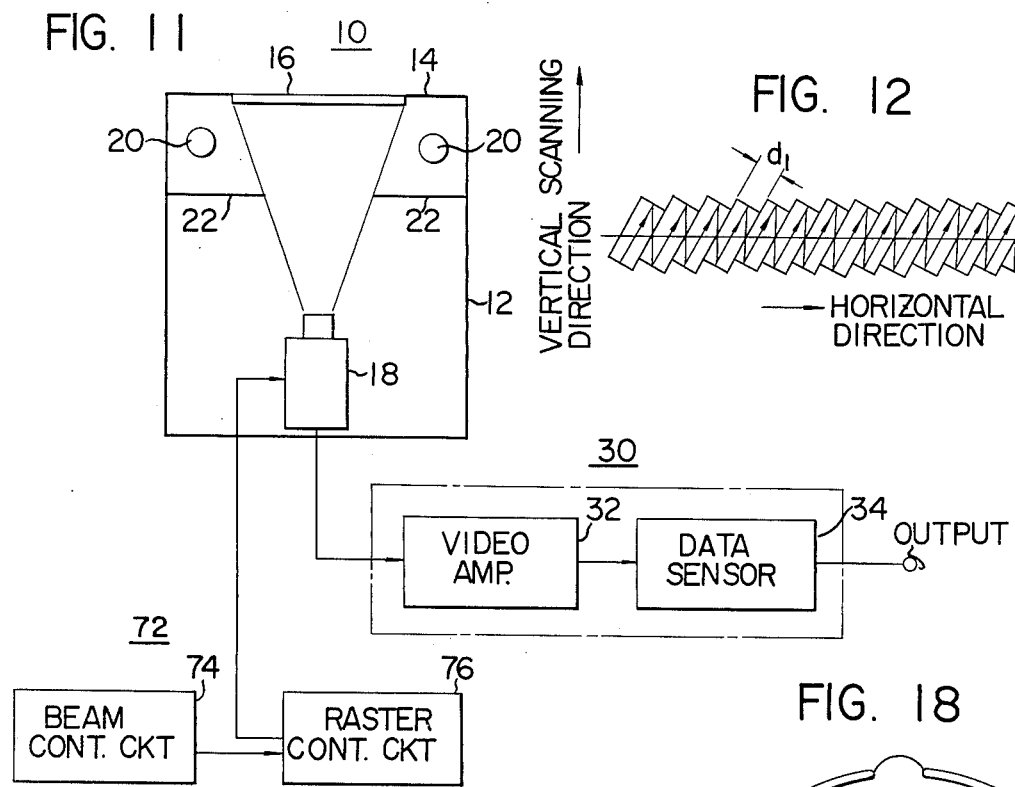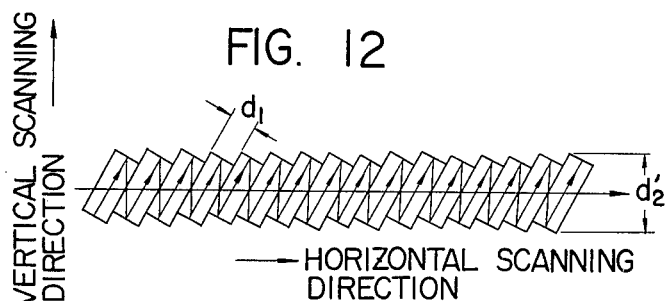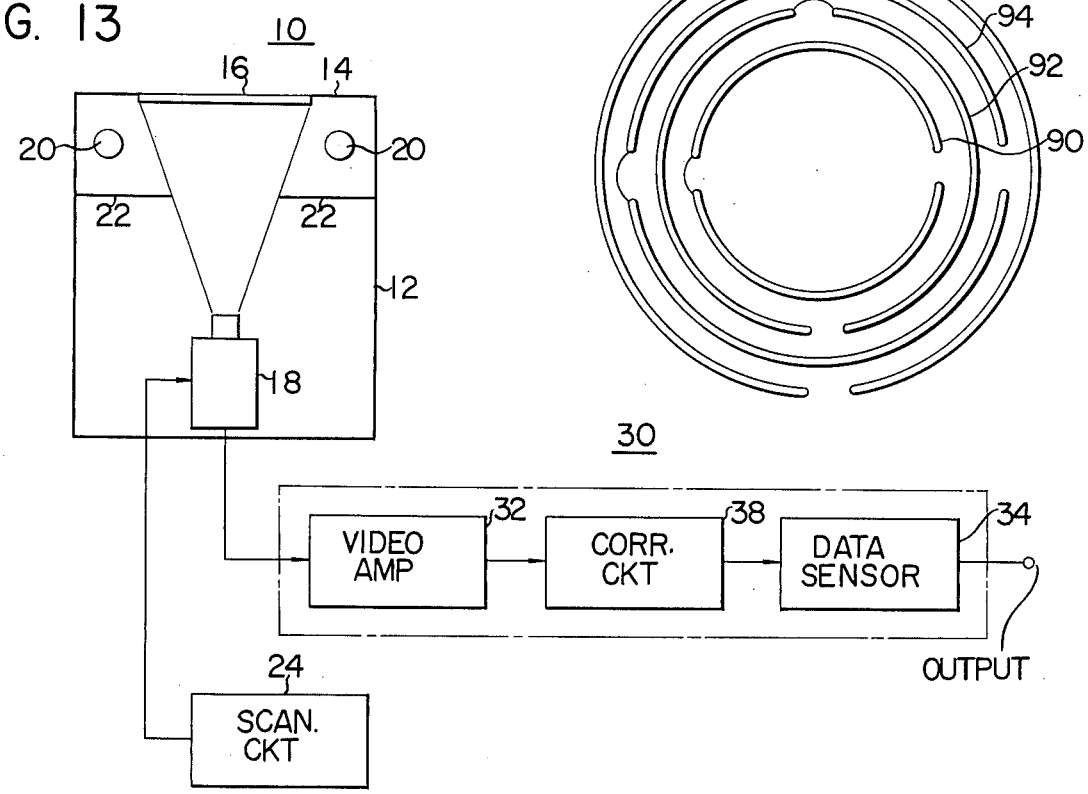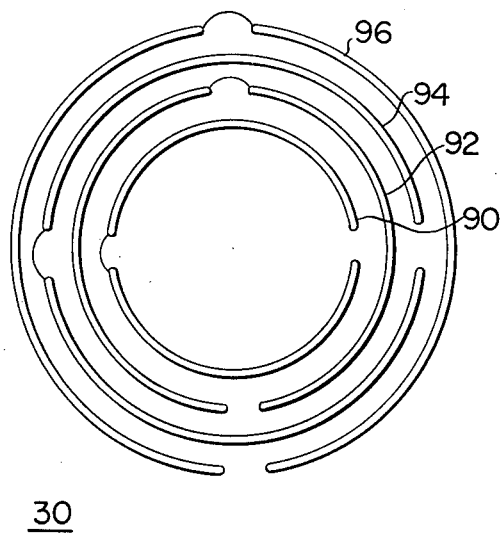

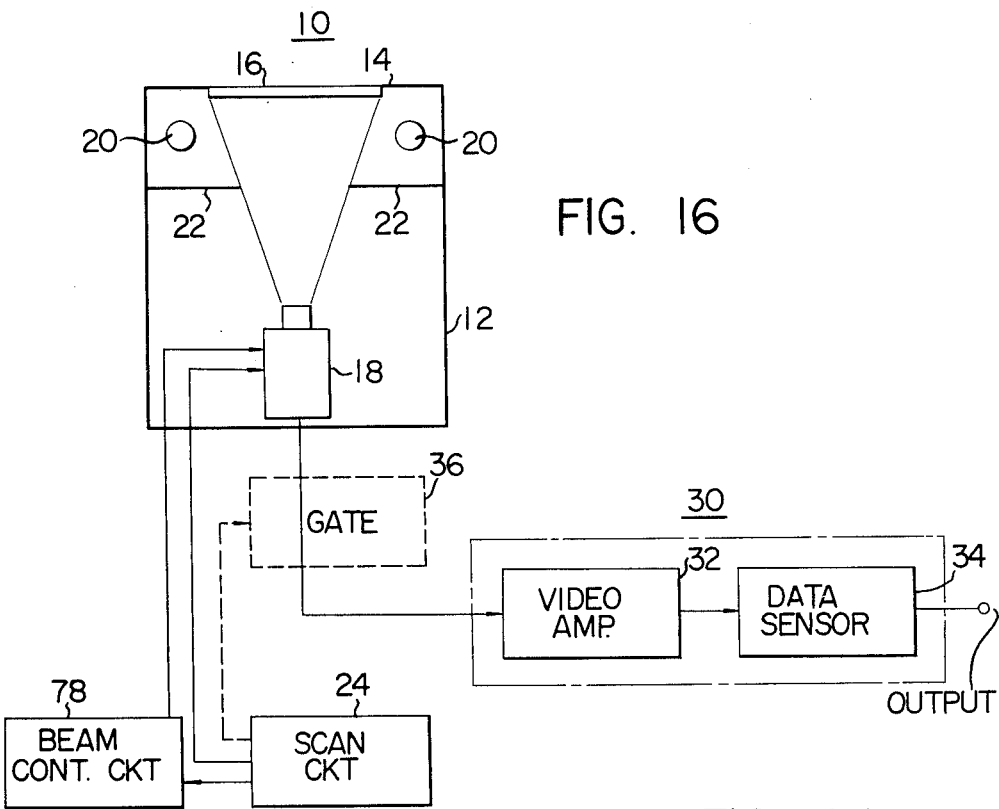
FIG. 16
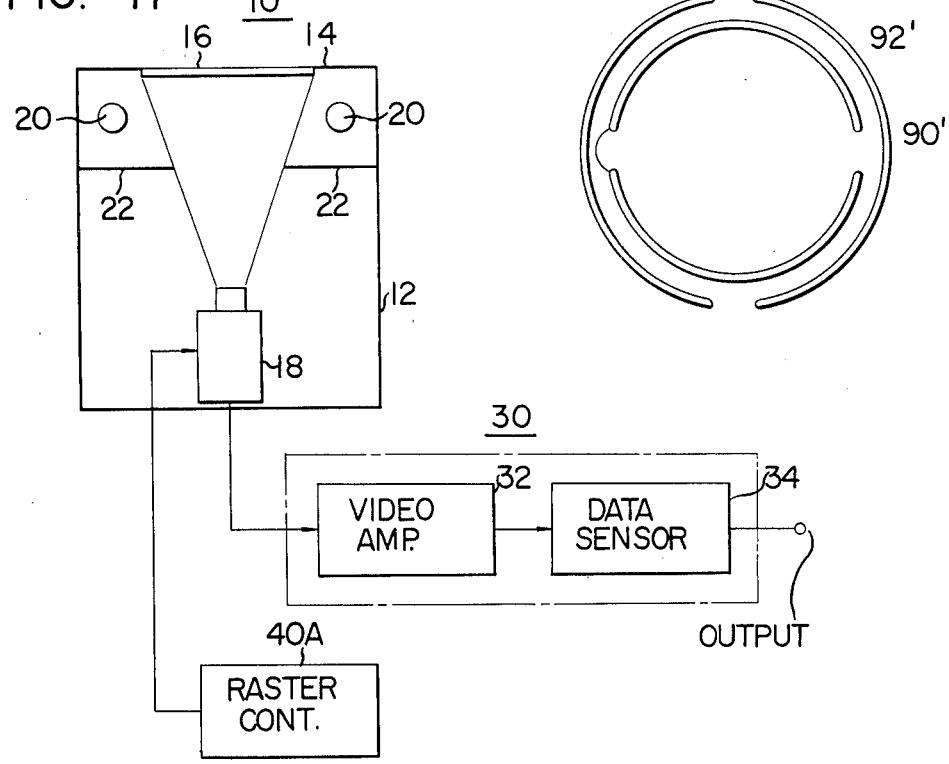
FIG. 17
FIG. 21

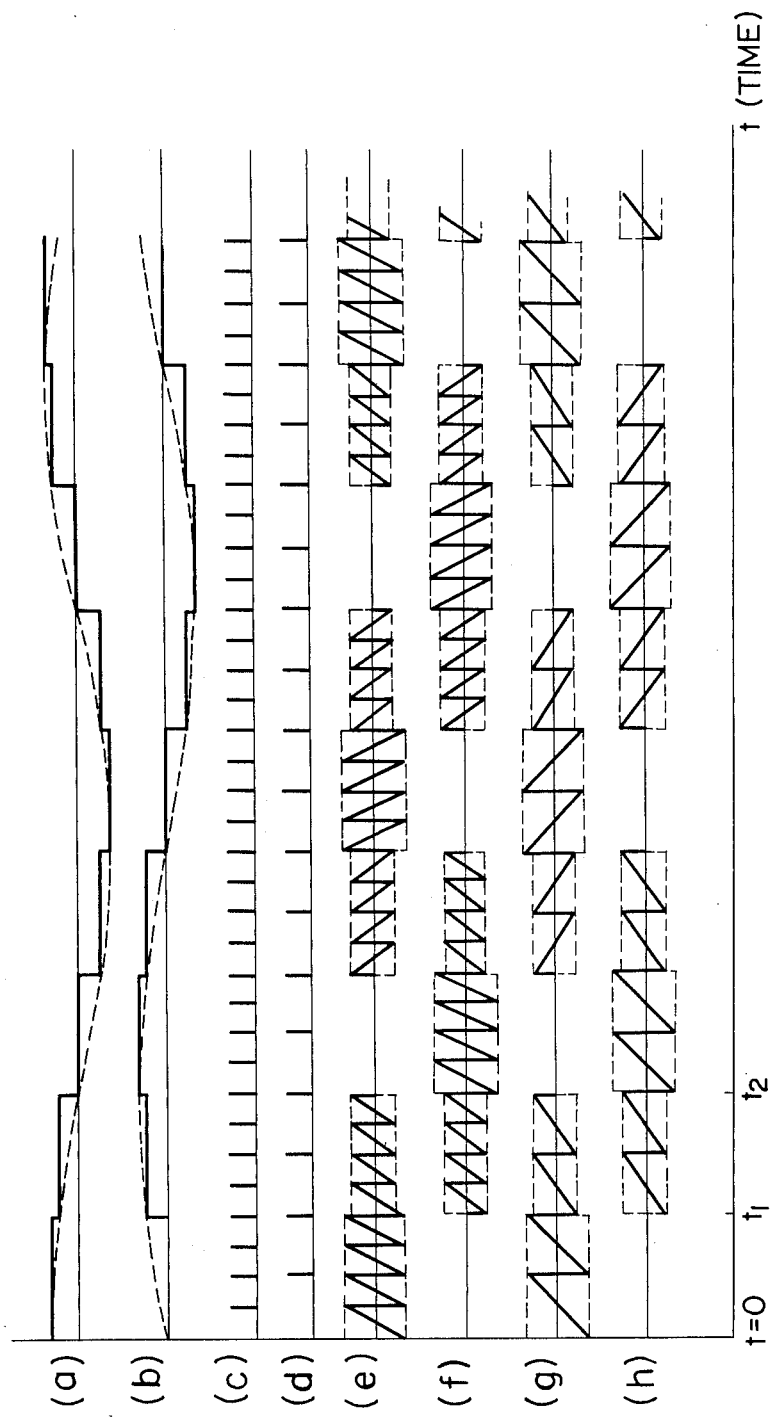

INFORMATION READING SYSTEM

BACKGROUND OF THE INVENTION

This invention relates to an information reading system using a television camera to read out information expressed, for example, by the array of bar codes printed on bar coded labels corresponding to price tags affixed to goods.

In order to automatically read out bar coded labels, it has been already proposed to pick up each bar coded labels affixed to goods by a television camera and process the resulting video signal from the television camera. In this case the television camera has normally picked up the bar coded label while a raster formed of scanning lines or beams produced therein is rotated at a predetermined speed of rotation for the purpose of preventing some bar codes of the array from failing to be picked up by the camera. Under these circumstances, a video signal from a field thus rotated has been affected by uneven after-images left on the television camera due to that field scanned immediately prior to the rotation thus resulting in the occurence of a spurious video signal. This is because a gap is present between each pair of adjacent scanning lines or beams. Such a spurious video signal has caused an error in reading out information.

Accordingly it is an object of the present invention to provide a new and improved information reading system decreased in reading error resulting from after-images left on a television camera involved.

SUMMARY OF THE INVENTION

The present invention provides an information reading system comprising a pedestal including a transparent window, a television camera disposed in opposite relationship with the transparent window on the pedestal, the television camera including an output and having a raster formed of scanning lines produced therein and rotated, signal processing means connected to the output of the television camera to process a video signal produced by the television camera, and a raster control circuit connected to the television camera to at least contact each pair of adjacent scanning lines with each other.

The present invention also provide an information reading system comprising a pedestal including a transparent window, a television camera disposed in opposite relationship with the transparent window on said pedestal, the television camera including an output and having a raster formed of scanning lines produced therein and rotated, signal processing means including a sensor circuit connected to the output of the television camera produced by a raster control circuit connected to the television camera to control the scanning of the scanning lines, and means for selectively supplying an output signal from the television camera to the sensor circuit.

A characteristic feature of the present invention is to include a selection circuit for rejecting a video signal due to uneven after-images on a television camera involved.

Another characteristic feature of the present invention is to utilize the correlation between video signals caused from a plurality of scanning lines located adjacent to one another.

Still another characteristic feature of the present invention is to cause the particular television camera to produce narrow scanning beams alternating with wide scanning beams.

And still another characteristic feature of the present invention is to contact each pair of adjacent scanning lines produced in the particular television camera with each other while rotating a raster formed of such scanning lines in the incremental manner.

BRIEF DESCRIPTION OF THE DRAWINGS

The present invention will become more readily apparent from the following detailed description taken in conjunction with the accompanying drawings in which:

FIG. 1A is a plan view of a bar coded label illustrating directions in which a television camera involved scans the label;

FIG. 1B and 1C are diagrams illustrating video signals produced by scanning the bar coded label of FIG. 1A in the direction shown in FIG. 1A by the television camera;

FIG. 2 is a schematic diagram of a conventional system for reading out bar code labels;

FIGS. 3A and 3B are graphs respectively illustrating the charging and discharging characteristics of a television camera;

FIG. 4 is a diagram illustrating a raster on a television camera used with the prior art practice;

FIG. 5 is a diagram illustrating a waveform of a video signal caused from the raster shown in FIG. 4;

FIG. 6 is a schematic view of an information reading system constructed in accordance with the principles of the present invention;

FIG. 7A is a plan view of a pair of adjacent scanning lines used with the arrangement shown in FIG. 6;

FIG. 7B is a diagram illustrating a waveform of a video signal originating from the scanning lines shown in FIG. 7A with waveforms of other vides signals;

FIG. 8 is a graph illustrating the relationship between an intensity of an electron beam and a width thereof;

FIG. 9 is a schematic view of a modification of the present invention;

FIG. 10 is a schematic view similar to FIG. 9 but illustrating another modification of the present invention;

FIG. 11 is a schematic view similar to FIG. 9 but illustrating still another modification of the present invention;

FIG. 12 is a diagram useful in explaining a scanning method using a wobbling process;

FIG. 13 is a schematic view similar to FIG. 9 but illustrating a different modification of the present invention;

FIG. 14 is a block diagram of the correlation circuit shown in FIG. 13;

FIG. 15 is a plan view of a bar coded label useful in explaining the operation of the arrangement shown in FIGS. 13 and 14;

FIG. 16 is a schematic view similar to FIG. 9 but illustrating a separate modification of the present invention;

FIG. 17 is a schematic view similar to FIG. 9 but illustrating a modification of the arrangement shown in FIG. 6;

FIG. 18 is a sectional view of an assembly of deflection coils connected to the raster control circuit shown in FIG. 17;

FIG. 20 is a graph consisting of a-h, illustrating waveforms developed at various points in the arrangement shown in FIG. 19; and FIG. 21 is a sectional view of a modification of the assembly of deflection coils shown in FIG. 18.

DESCRIPTION OF THE PREFERRED EMBODIMENTS

Figure 19:
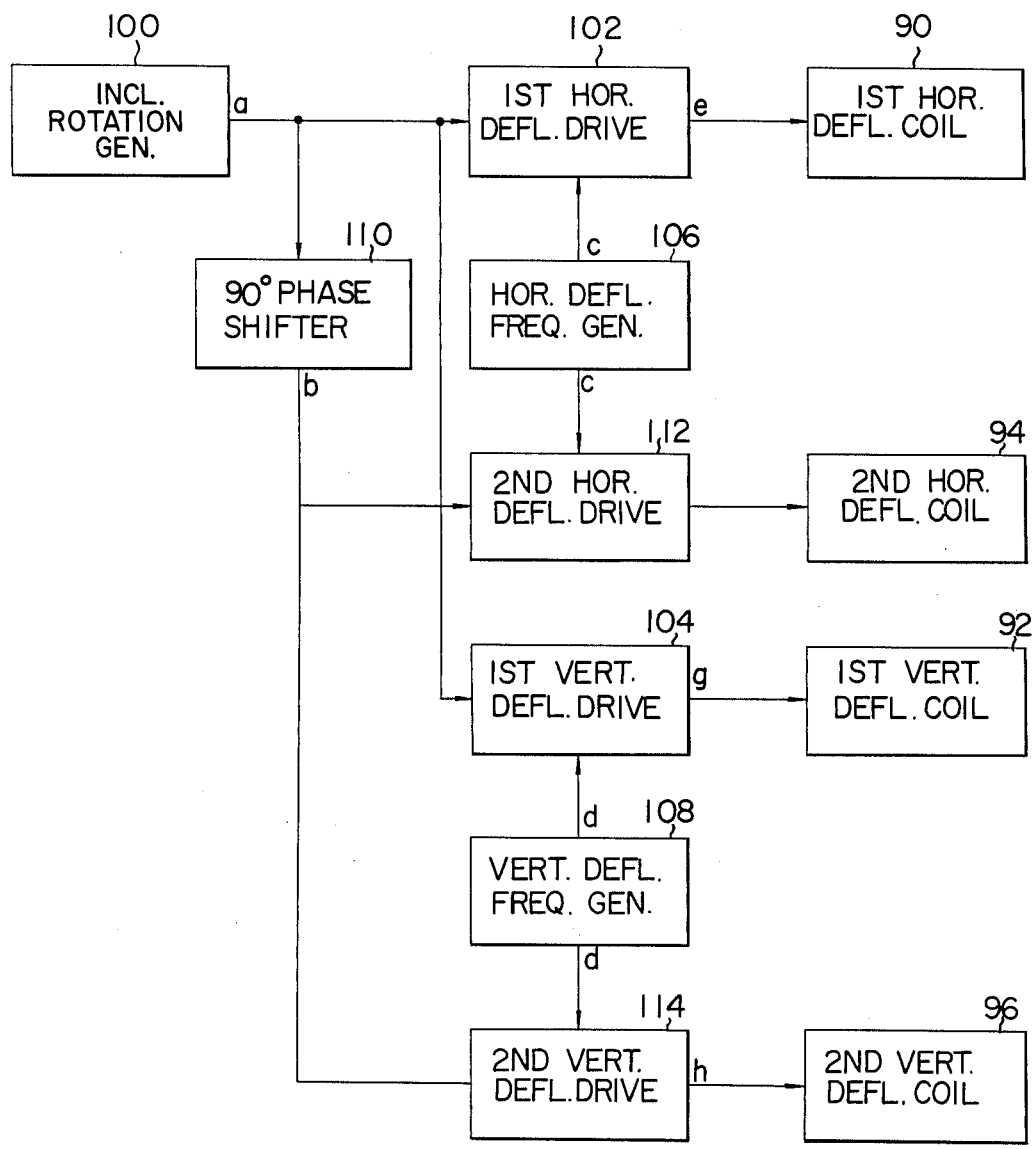
FIG. 19 is a block diagram of the details of the raster control circuit shown in FIG. 17.

Bar coded labels such as shown by the reference numeral 1 in FIG. 1 correspond to price tags generally affixed to goods and include the array of black bar codes 2 printed on the white ground thereof to extend more or less widthwise of the label. The array of bar codes is in the form of a binary number to indicate a price and other data of the goods. The array of bar codes 2 on the label 1 is usually picked up by an associated television camera (not shown) to be read out. In order to correctly read out the bar coded labels, scanning lines produced in the television camera are required to be properly located with respect to an array of bar codes on each label. That is, the scanning lines are required to coincide in direction with the array of bar codes. For example, if the scanning lines run along the longitudinal line labelled $H_o$ of the label 1, that is to say, if the scanning lines coincide in direction with the array of bar codes 2 then the television camera can produces a video signal having a correct waveform as shown in FIG. 1B. It will readily be understood that the correct reading of the label 1 is accomplished when the scanning lines have their direction lying between the line $H_o$ and a line $H_{o1}$, or $H_{o2}$ as shown in FIG. 1A. This is because the resulting video signal is of a waveform closely resembling the waveform as shown in FIG. 1B. However if the scanning lines run along a line $H_1$ as shown in FIG. 1A, that is to say, if the scanning lines do not coincide in direction with the array of bar codes 2 then the resulting video signal has a waveform such as shown in FIG. 1C. That is, the signal does not include bits representing a leading and a trailing bar code. Thus the label can not be read out.

Referring now to FIG. 2, there is illustrated a conventional information reading system for reading out bar coded labels by a television camera adapted to scan the labels in a direction coinciding with an array of bar codes thereon. The arrangement illustrated comprises an information reader unit generally designated by the reference number 10 for reading out an array of bar codes printed on a bar coded label, and a signal processing unit generally designated by the reference numeral 30 for sensing a signal representing the array of bar codes read out by the reader unit 10. The information reader unit 10 includes a casing 12 open at one end, in this case, the upper end as viewed in FIG. 2, a pedestal 14 disposed at the upper open end of the casing 12 including a central transparent window 16, and a television camera 18 disposed at the bottom of the casing 12 to be opposite to the transparent window 16 on the pedestal 14. An article of commerce having a bar coded label affixed thereto is adapted to be put on the pedestal 14 so that the label overlaid with the article of commerce is located on the transparent window 16 so as to contact an array of bar codes printed on the label with the latter, although the article of commerce and the label are not illustrated. The television camera 18 picks up the array of bar codes on the label. The reader unit 10 further comprises an annular source of light 20 disposed on the upper portion of the casing 12 to irradiate the transparent window 16 from the lower side thereof and an apertured shading plate 22 disposed below the source of light 20 to prevent light from the latter from directly entering the television camera 18. A scanning circuit 24 is operatively coupled to the television camera 18 to control the rotation of a raster formed of scanning lines or beams produced within the television camera 18.

The signal processing unit 30 includes a video amplifier 32 connected to the output of the television camera 18 to amplify a video signal produced by the television camera 18 and a data sensor circuit 34 connected to the video amplifier 32 to convert the amplified video signal to a corresponding digital signal thereby to sense a signal corresponding to information expressed by the array of bar codes printed on the label.

The operation of the arrangement as shown in FIG. 2 will now be described. First a bar coded label is disposed on the transparent window 16 and irradiated with light from the source of light 20 and picked up by the television camera 18. The resulting video signal from the television camera 18 expresses information represented by the array of bar codes on the label and is delivered to the signal processing unit 30.

As above described in conjunction with FIG. 1, a scanning line such as shown at $H_o$ in FIG. 1A can pass through all the bar codes on the label because the television camera effects scanning substantially coinciding in direction with the array of the bar codes. In this case a complete video signal such as shown in FIG. 1B is developed at the output of the television camera 18 and delivered to the signal processing unit 30. On the other hand, if the scanning does not coincide in direction with the array of bar codes on the label then all the bar codes on the label will not always be scanned with scanning line such as shown at $H_l$ in FIG. 1A. This results in the formation of an incomplete video signal missing some information of the bar codes which is shown, by way of example, in FIG. 1C. Therefore the label cannot be read out.

Under these circumstances, a raster formed on the television camera 18 of scanning lines produced therein is rotated at a predetermined fixed speed by the scanning circuit 24 while an output from the television camera 18 is sensed. When it has been determined that the sensed output has a complete waveform, the bar coded label is read out, on the presumption that the scanning lines have coincided in direction with the array of the bar codes.

The pickup tube used in conventional television camera has characteristics such as shown in FIGS. 3A and 3B. As shown in FIG. 3A, the irradiation with light causes a photoconductive film disposed in the tube to rise in surface potential with a fixed time constant as time elaspes. On the other hand, if the photoconductive film is stopped being irradiated with light followed by the application of a scanning electron beam thereto then the surface potential on the photoconductive film decreases with an increase in the number of scans as shown in FIG. 3B wherein the scanning is effected at 60 fields per seconds.

The description will now be made in conjunction with the pickup effected by a television camera including a pickup tube having the characterisitcs as above described and a raster being rotated.

In FIG. 4 which illustrates the relationship between a raster and scanning lines, solid rectangles designate scanning lines in the ith field and dotted rectangles designate scanning lines in the (i+1)the field. Each scanning lines is shown as having a width of $d_1$ and a spacing of $d_2$ between the same and the adjacent line. The scanning lines in the (i+1)th field have been rotated through angles of $\theta$ with respect to those in the ith field.

As above described in conjunction with FIG. 3, once the photoconductive film has been scanned with an electron beam, the continuation of the irradiation with light does not lead to an immediate rise of the surface potential on the photoconductive film. Therefore during the scanning in the (i+1)th field those areas of the photoconductive film scanned in the ith field as designated by the reference character a are different in output level from those areas thereof not scanned in the ith field as designated by the reference character b in FIG. 4. For example, the resulting video signal has a waveform such as shown in FIG. 5. As shown, each scanning line in the (i+1)th field produces a video signal including a plurality of signal portions due to the areas a and alternating signal portions due to the areas b lower in output level than the signal portions due to the areas a, for its period H. This video signal forms a spurious signal.

From the foregoing it is seen that, when the television camera employed in conventional information reading systems reads out a bar coded label while its raster is rotated, the resulting video signal includes the desired information expressed by the array of bar codes read out by the television camera and a spurious signal as above described. In order words, a video signal originating from each field is affected by after-images left on the television camera through the scanning of the preceding field. This is because the scanning is effected with scanning lines each having the spacing of $d_2$ between the same and the adjacent line. Thus conventional information reading systems have been disadvantageous in that spurious signals may be sensed.

The present invention contemplates to minimize or substantially eliminate the spurious video signal as above described in conjunction with FIGS. 4 and 5.

Referring now to FIG. 6 wherein like reference numerals designate the components identical or corresponding to those shown in FIG. 2, there is illustrated one embodiment according to the information reading system of the present invention. The arrangement illustrated is different from that shown in FIG. 2 only in that in FIG. 6, a raster control circuit 40 is operatively connected to the television camera 18 to cause the latter to form scanning lines so as to at least contact each pair of adjacent scanning lines with each other. In conventional television cameras, the horizontal and vertical synchronizing frequencies are of 15.75 KHz and 60 Hz respectively and each scanning line has a width d of about 30 $\mu$ by taking account of the resolution of arrays of bar codes and a spacing $d_2$ of about 30 $\mu$ between the same and the adjacent scanning line. In FIG. 6, however, the raster control circuit 40 applies to the television camera 18 such a control signal that the spacing between the adjacent lines disappears. In other words, the vertical synchronizing frequency is made equal to 30 Hz with the horizontal synchronizing frequency and the width d of the scanning lines remaining unchanged. This measure can decrease a reading error due to after-images on the television camera.

As in the arrangement of FIG. 2, the raster control circuit 40 is also operative to rotate the raster on the television camera 18 in the incremental manner so that each scanning line or beam is somewhat different in scanning direction from the just preceding line or beam. Under these circumstances, if the central distance between the adjacent scanning beams is equal to the beam width thereof as in the case when the raster is maintained stationary, then each pair of adjacent beam overlaps each other so that the overlapped portion is maximum at their starting point and gradually decreased toward their end point where the beams are contacted by each other as shown in FIG. 7A. If each scanning beam has an electron density uniform throughout the width thereof then the resulting output from the television camera is decreased on the overlapped beam portion as shown at dotted and dashed line 50 in FIG. 7B. However the scanning beam actually has a profile of electron density maximum at the center thereof and decreased toward each edge thereof as shown in FIG. 8. As a result, a decrease or an increase in output from the television camera is small enough to permit the latter to produce an output such as shown at dotted line 52 in FIG. 7B which is out of the question as compared with a normal output as shown at solid line 54 in FIG. 7B.

Thus it is seen that a change in output can be extremely small by adjusting both the spacing between the adjacent scanning lines and a rotational speed of the raster.

The raster is normally rotated in the incremental manner and in one direction in order to determine a correct scanning direction. However after the raster has been rotated in this way to reach a predetermined angular position, it may be stepwise returned back to its original angular position. Alternatively the raster may stepwise reciprocate between both the angular positions as above described. The term "rotation of the raster" used herein involves all the cases just described.

The present invention has been described in conjunction with the measure of forming the raster of the scanning lines so as to contact each pair of adjacent scanning lines with each other by controlling the vertical synchronizing frequency with the width of electron beam remaining unchanged. But it is to be understood that such a measure may be attained by other means. For example, an electron lens or lenses disposed in the television camera may be controlled within limits of the resolution of bar codes thereby to increase an area occupied by the electron beam.

In FIG. 9 wherein like reference numerals designate the components identical or corresponding to those shown in FIG. 2 there is illustrated a modification of the present invention. The arrangement illustrated is different from that shown in FIG. 2 only in that in FIG. 9 a raster control circuit 42 connected to the television camera 18 is operative to rotate the raster in the incremental manner and a gate circuit 36 is interposed between the video amplifier 32 and the data sensor circuit 34 and also connected to the raster control circuit 42.

It is now assumed that in FIG. 1, $H_{01}$ designates that scanning line effectively traversing the array of bar codes 2 printed on the bar coded label 1 at a maximum angle relative to the control lines $H_0$ and $H_{02}$ designates that scanning line effectively traversing the bar codes 2 at a minimum angle relative to the line $H_0$ while $\theta_{12}$ designates an angle formed between the scanning lines $H_{01}$ and $H_{02}$.

The raster control circuit 42 as shown in FIG. 9 is designed and constructed so that a predetermined number more than one of field scans are effected in a predetermined fixed direction and that each time the predetermined number of field scans have been effected, the scanning direction is rotated through an incremental angle of $(\theta_{12}-\alpha)$ where $\alpha$ is a constant as determined by both the number of scanning lines required for reading out the array of bar codes and the beam width $d_1$ of the scanning lines. To this end, a pulse motor (not shown) may be used to successively apply pulses to a set of deflection coils (not shown) disposed in the television camera 18 to scan electron beams in the camera at time intervals corresponding to the predetermined number of field scars while the deflection coils have deflection signals applied thereto as in usual television camera.

Alternatively, one pair of vertical and horizontal deflection coils used in conventional television cameras and another pair of similar deflection coils may be disposed in quadrature relationship. Then electrical signals formed of vertical and horizontal deflection signals balance-modulated with a signal for incremental rotation from the circuit 42 are applied to each pair of deflection coils to effect the incremental rotation of the raster which will be described in detail hereinafter.

The operation of the arrangement as shown in FIG. 9 will now be described on the assumption that each pair of consecutive fields are scanned in a predetermined direction. A video signal from the television camera 18 originating from ith field is amplified by the video amplifier 32 and then applied to the gate circuit 36. A gating signal from the raster control circuit 42 is applied to the gate circuit 36 to open it during a time period for the ith field. Thus the video signal passes through the now open gate circuit 36 and enters the data sensor circuit 34 where it is processed.

After the ith field has been completed to be scanned, the raster control circuit 42 applies a control signal to the television camera 18 to rotate its raster through an angle of $(\theta_{12}-\alpha)$ while at the same time it controls the gate circuit 36 to close the latter. Then the scanning enters the (i+1)th field. Therefore a video signal due to the (i+1)th field including an after-image signal caused from the scanning of the just preceding field is blocked by the now closed gate circuit 36 to be prevented from being processed by the data sensor circuit 34. Thus it will be understood that the gate circuit 36 functions as a selection circuit.

During a time period for the (i+2)th field the control circuit 42 is not operated to rotate the raster but maintains the gate circuit 36 in its closed state. This means that a video signal including after-image signals resulting from the scanning of the ith and (i+1)th fields is not processed in the data sensor circuit 34. Also after the ith and (i+1)th fields have been scanned, the effect of the after-image due to the scanning of the ith field is decreased. Under these circumstances, the control circuit 42 opens the gate circuit 36 during the period of the (i+3)th field to permit a video signal to be processed by the sensor circuit 34 as during the period of the ith field.

Then the raster is rotated after which the process as above described is repeated.

From the foregoing it is seen that the arrangement of FIG. 9 is effective for decreasing a reading error due to uneven after-images developed on the television camera.

In the arrangement of FIG. 9, two consecutive fields following each rotation of the raster have been rejected upon processing the video signal by the data sensor circuit 20. However, a satisfactory result may be given by such an alternative measure that, after a video signal due to the scanning of the ith field has been processed by the data sensor circuit 34, a video signal caused from the (i+1)th field is rejected while the raster is left intact. Then the raster is rotated and a video signal resulting from the (i+2)th field is rejected with the raster maintained intact after which a video signal originating from the (i+3)th field is processed by the sensor circuit 34.

Also while the gate circuit 36 serving as the selection circuit has rejected two fields it is to be understood that the number of those fields rejected by the gate circuit may increase to more than two. It will be appreciated that the higher the number of the rejected field the effect of a reading error due to uneven after-images decreases.

Thus it is seen that the arrangement of FIG. 9 provides an information reading apparatus including a selection circuit for rejecting a video signal including signal portions caused from uneven after-images.

FIG. 10 wherein like reference numerals designate the components identical or corresponding to those shown in FIG. 2 illustrates another modification of the present invention utilizing a scanning beam of elliptical cross section having a minor axis in a horizontal or scanning direction and a major axis in a direction perpendicular to the scanning direction. The arrangement illustrated comprises a television camera generally designated by the reference numeral 60 including a pickup tube 62 and a set of deflection coils 64 and a focussing coil 66 disposed around the pickup tube 62. The focussing coil 66 has a cross section in the form of an ellipse having a major axis in the vertical direction and a minor axis in the horizontal direction to form an elliptic scanning beam having a major axis of about 60 um and a minor axis of about 30 um. Thus it will be appreciated that each pair of adjacent scanning beams substantially contact each other.

The arrangement further comprises a raster control unit generally designated by the reference numeral 68 and formed of the scanning circuit 24, the set of deflection coils 64, the focussing coil 66 and a rotary driving device 70. The driving device 70 is responsive to the synchronizing signal from the scanning circuit 24 to rotate an electric motor involved (not shown) to mechanically rotate both the deflection and focussing coils 64 and 66 respectively as a single unit through a gearing.

In other respects, the arrangement is identical to that shown in FIG. 2.

In the arrangement as above described, the desired raster can be formed without the resolution of bar codes decreased as well as without the number of scanning lines increased while a reading error due to the after-images developed on the television camera can be decreased upon reading out bar codes.

In the arrangement of FIG. 10, the raster formed of scanning lines may be electrically rotated as above outlined in conjunction with FIG. 9.

In the arrangement of FIG. 10 it will readily be understood that instead of the focussing coil having an elliptical cross-section, an electronic lens or lenses disposed in the pickup tube to focus an electron beam may be used to establish an electrostatic or magnetic field in the form of an ellipse thereby to form an elliptical beam of electrons.

Thus it is seen that the arrangement of FIG. 10 provides an information reading apparatus decreased in reading error due to the after-image developed on the television camera by forming a raster of scanning beams having an elliptical cross section or equivalent beams thereto while each pair of adjacent beams are contacted by each other.

Still another embodiment of the present invention is illustrated in FIG. 11 wherein like reference numerals designate the components identical or corresponding to those shown in FIG. 2. The arrangement illustrated utilizes the wobbling process well known in the art and comprises a raster control unit generally designated by the reference numeral 72 including a beam control circuit 74, a raster control circuit 76 connected to the beam control circuit 74 and deflection coil means (not shown) for the television camera 18. The television camera 18 produces scanning beams of circular shape forming a raster that is electrically rotated. The beam control circuit 74 includes a high frequency generator for generating a train of wobbling pulses and blanking generator for generating a wobbling blanking signal although both generators are not illustrated. The wobbling pulse from the beam control circuit 74 is applied to the raster control circuit 76 to be added to vertical deflection pulse produced in the latter followed by the intergration of the sum thereof. Then the deflection coil means (not shown) responds to the integrated signal from the raster control circuit 76 to impart to each horizontally scanning line an excursion or a vibration substantially perpendicular to the scanning line. The blanking signal from the beam control circuit 74 is applied through the control circuit 76 to the deflection coil means to blank that portion of the vertical excursion or vibration directed in one sense thereby to prevent each scanning beam from overlapping the adjacent scanning beam. The resulting scanning beam is shown in FIG. 12 as having a pitch of $d_1$ and a peak-to-peak value of $d_2'$. The scanning beam preferably vertically vibrates so as to form continuous saw teeth.

In other respect the arrangement is identical to that shown in FIG. 2.

The arrangement of FIG. 11 gives a similar result as above described in conjunction with the scanning with the elliptical beam.

Still another modification of the present invention is shown in FIG. 13 wherein like reference numerals designate the components identical or corresponding to those shown in FIG. 2. The arrangement illustrated is identical to that shown in FIG. 2 excepting that in FIG. 13 a correlation circuit 38 is interposed between the video amplifier 32 and the data sensor circuit 34. The correlation circuit 38 utilizes the correlation between a pair of signals caused from a pair of adjacent scanning lines in a common field that is a raster formed of the scanning lines in order to remove correlative noise.

As shown in FIG. 14, the correlation circuit 38 includes an input terminal 80 connected to the output of the video amplifier 32 (not shown in FIG. 14) to receive the amplified video signal from the latter. The input terminal 80 is connected to a time delay circuit 82 subsequently connected to one input to a differential composition circuit 84 including the other input connected to the input terminal 80 and an output terminal 86. The time delay circuit 82 is operative to delay the video signal applied thereto a time interval equal to twice the period H of the consecutive scanning lines. The differential composition circuit 84 delivers to the output 86 a difference signal between a video signal without a time delay due to a scanning line and a video signal with a time delay of 2 H due to that scanning line preceding two lines. The difference signal is substantially free from correlative noise as will be subsequently described.

The operation of the arrangement as shown in FIGS. 13 and 14 will now be described with reference to FIG. 15. FIG. 15 shows a bar coded label 1 similar to that illustrated in FIG. 1 and having an array of bar codes printed thereon as schematically shown by a rectangle 2. FIG. 15 also shows a plurality, in this case, seven of scanning lines $H_{101}$ through $H_{107}$ developed in a common field. The scanning line $H_{102}$ has scanned the upper marginal portion of the label 1 to cause the television camera 18 to produce a corresponding video signal. This video signal is amplified by the video amplifier 32 and then applied to the time delay circuit 82 of the correlation circuit 38 through the input terminal 80. After the lapse of a time interval of 2 H, a video signal due to the scanning line $H_{104}$ is similarly amplifier by the video amplified and then applied to the other input to the differential composition circuit 84. At the same time, the first video signal due to the first scanning line $H_{102}$ delayed the time interval of 2 H is applied to the one input to the differential composition circuit 84. The first video signal due to the scanning line $H_{102}$ is caused from the marginal portion of the bar coded level 1 and therefore it principally includes uniform noise resulting from the after-image or the like on the television camera 18. On the other hand, the second video signal due to the scanning line $H_{104}$ includes a signal representing information expressed by the array of bar codes 2 printed on the label 1. Thus the second video signal principally has a coded signal resulting from the array of bar codes and uniform noise caused from the after-image or the like on the television camera 18 correlative to the first video signal due to the scanning line $H_{102}$.

Since the differential composition circuit 38 produces a difference between those two video signals, the same provides an output formed of the coded signal coded resulting from the array of bar codes 2 on the label 1 but free from uniform noise due to the after-image or the like having the correlation with the video signal due to the scanning line $H_{102}$.

It is noted that the data sensor circuit 34 is designed and constructed such that, by checking a bit composition of an output from the differential composition circuit 84, only that signal having a predetermined bit composition is sensed and processed. Therefore any spurious signal other than that above described, though present, can not be sensed as the required signal.

The arrangement as shown in FIGS. 13 and 14 is additionally advantageous in that the raster can be formed of a smaller number of scanning lines and therefore a time of reading out a bar coded label can be decreased because each pair of adjacent scanning lines are permitted to have a wider spacing formed therebetween.

If desired, a video signal due to the scanning line $H_{101}$ or $H_{107}$ scanning the outside of the bar coded level 1 may be utilized in place of the first video signal due to the scanning line $H_{102}$. Further while the arrangement has been described on the premise that the problems are solved which are encountered with the scanning lines spaced away from one another by a spacing of $d_2$ (see FIG. 4) it is to be understood that the same is equally applicable to scanning lines having no spacing therebetween.

Also while the arrangement has been described in conjunction with a pair of video signals resulting from a common field it is to be understood that the same is effective for reading out an array of bar codes by utilizing a pair of video signals due to scanning lines appearing respectively in two different fields with a corresponding raster rotated stepwise but not continuously. For example, any one of scanning lines $H_{101}$, $H_{102}$, $H_{106}$ and $H_{107}$ in a field and any one of scanning lines $H_{103}$ through $H_{105}$ in a different field may be utilized to form a pair of video signals.

In FIG. 16 wherein like reference numerals designate the components identical or corresponding to those shown in FIG. 2 there is illustrated a different modification of the present invention wherein a beam width of a scanning beam is controlled to alternate narrow beams with wide beams. As shown in FIG. 16, a beam control circuit 78 is connected to a focussing coil (not shown) for the television camera 18 and applied with a synchronizing signal from the scanning circuit 24. The beam control circuit 78 supplies first a control signal to the focussing coil (not shown) under the control of the scanning circuit 24 thereby to make an associated scanning beam narrow. A video signal resulting from a single scanning line due to this narrow beam is amplified by the video amplifier 32 and applied to the data sensor circuit 34 where it is sensed whereby an associated array of bar codes is read out. Then the beam control circuit 78 applies to the focussing coil (not shown) a control signal effective for making an associated scanning beam wide. This wide beam is dimensioned so that it is contacted by the just preceding scanning line due to the narrow beam. Like the video signal due to the narrow scanning line, a video signal due to the wide scanning beam is amplified and applied to the data sensor circuit. However this video signal is not sensed by the data sensor circuit 34 because the original beam is wide enough to decrease the resolution required for reading out the array of bar codes. Then the next succeeding scanning beam is controlled to be narrowed. Thereafter the process as above described is repeated to read out the array of bar codes from that video signal caused from the narrow beam while the narrow and wide beams form a single raster for one field.

The arrangement has the additional advantages as above described in conjunction with FIG. 10.

As shown by dotted rectangle 36 in FIG. 16, a gate circuit 36 may be connected between the television camera 18 and the signal processing unit 30. The gate circuit 36 is identical to the gate circuit 36 shown in FIG. 6 to block a video signal caused from the wide scanning beam thereby to prevent an associated array of bar codes from being erroneously read out.

Also if the scanning with a wide beam overlaps the scanning by a narrow beam following the wide beam then a photoconductive film of a pickup tube (not shown) disposed in the television camera 18 decreases in surface potential resulting in a decrease in video signal produced by the camera. Therefore it is desirable to arrange scanning lines in parallel relationships and accordingly to rotate an associated raster in the incremental manner.

In the arrangement of FIG. 16 the narrow scanning beams cooperate with the wide scanning beams to form a single raster, but it may be modified so that the narrow beams form a first raster having a spacing of $d_1$ between each pair of adjacent scanning lines due to the narrow beams after which the wide beams form a second raster so as to fill that spacing with each wide beam. In the latter case, video signals caused from the first raster are used to read out an associated array of bar codes while video signals caused from the second raster may be removed by using the gate circuit 36. Alternatively, the gate circuit 36 may not be used if desired. Further the wide beams may be used to scan the first raster to fill all the spacings.

Also while the narrow scanning beams alternating the wide scanning beams have formed by using the beam control circuit 78 for applying the control signals to the focussing coil or electrode it is to be understood that the beam control circuit may be modified to control at least two electron guns (not shown) disposed within the television camera 18.

A modification of the arrangement as shown in FIG. 6 is illustrated in FIG. 17 wherein like reference numerals designate the components identical or corresponding to those shown in FIG. 2. The arrangement illustrated is different from that shown in FIG. 6 only in that in FIG. 17 a raster control circuit 40A has, in addition to the function of contacting each pair of adjacent scanning lines with each other, the function of electrically rotating a raster formed of such scanning lines in the incremental manner. As in the arrangement of FIG. 6, the raster control circuit 40A is operative to produce a vertical synchronizing frequency of 30 Hz with a horizontal synchronizing frequency and the width $d_1$ of scanning lines remaining unchanged, and also to rotate the scanning direction through an incremental angle of $(\theta_{12} - \alpha)$ each time one field forming a single raster has been scanned in a predetermined direction. The $\theta_{12}$ is designated in FIG. 1 and $\alpha$ has been defined in the description for FIG. 9.

In order to electrically rotate an image formed on the television camera 18 in the incremental manner, the television camera 18 is provided with an assembly of deflection coils as shown in FIG. 18. The arrangement illustrated includes a first horizontal and a first vertical deflection coils 90 and 92 respectively disposed in quadrature relationship with a second horizontal and a second vertical deflection coils 94 and 96 respectively. All the deflection coils are of the conventional construction. The second vertical deflection coil 94 is adapted to produce a magnetic flux orthogonal to first vertical deflection coil 92 while the second horizontal deflection coil 96 is adapted to produce a magnetic flux orthogonal to the first horizontal coil 90. A saw-toothed deflection current is supplied to each of the second horizontal and vertical deflection coils 94 or 96 simultaneously with the application of a saw-toothed deflection current to each of the first horizontal and vertical deflection coils 90 and 92 in quadrature relationship with the first-mentioned current to rotate the image on the television camera in the incremental manner. The saw-toothed deflection current is amplitude modulated with a stepped waveform formed by sampling and holding a sinusoidal wave for predetermined time intervals.

The raster control circuit 40A can be constructed as shown in FIG. 19. The arrangement illustrated will now be described in conjunction with FIG. 20 wherein there are shown waveforms developed at various points in the arrangement with rotations effected through incremental angles of 45°. As shown in FIG. 19, the raster control circuit 40A comprises an incremental rotation generator 100 connected to a first horizontal driving circuit 102 subsequently connected to the first horizontal deflection coil 90 as shown in FIG. 18. The generator 100 is also connected by a first vertical driving circuit 104 to the first vertical deflection coil 92 as shown in FIG. 18. The incremental rotation generator 100 generates an incremental rotation signal for determining a speed of rotation of an image on the television camera 18 where the image is rotated in the incremental manner. The generator 100 utilizes a signal formed by sampling and holding a sinusoidal signal for time periods dependent upon a predetermined angle of rotation to produce a stepped output as shown at waveform (a) in FIG. 20. The sinuoidal signal is also shown at dotted line in FIG. 20 (a).

The first horizontal driving circuit 102 receives the waveform (a) from the generator 100 and also an output from a horizontal deflection frequency generator 106 for determining both a horizontal scanning frequency and a ratio of a scanning to a blanking time. The output from the circuit 106 is shown at waveform (c) in FIG. 10. Thus the driving circuit 102 produces a horizontal deflection current as shown at saw-toothed waveform (e) in FIG. 20. This deflection current is supplied to the first horizontal deflection coil 90. The horizontal driving circuit 102 may be formed, for example, of a pair of conventional horizontal deflection circuits operatively associated with each other and an electric source therefore having an incremental rotation signal applied thereto.

Similarly the first vertical driving circuit 104 receives the waveform (a) from the generator 100 and also an output from a vertical deflection frequency generator circuit 108 for determining both a vertical scanning frequency and a ratio of a scanning to a blanking time. Thus the driving circuit 104 produces a vertical deflection current as shown at waveform (g) in FIG. 20 from the waveform (a) produced by the generator 100 and the output (see waveform (d) shown in FIG. 20) produced by the driving circuit 108. For example, a saw-toothed voltage for the vertical deflection may be formed of a vertical deflection frequency signal and balance-modulated with the incremental rotation signal to produce the saw-toothed deflection current. This deflection current is supplied to the first vertical deflection coil 92 as shown in FIG. 18.

As above described, the deflection current or signal supplied to each of the second horizontal and vertical deflection coils 94 or 96 is required to have a phase difference of 90° relative to the deflection signal supplied to each of the first horizontal and vertical deflection coils 90 or 92. Therefore the output from the generator 100 is applied to a 90° phase shifter 110 where it is subjected to a phase shift of 90°. That is, an output from the phase shifter 110 is different in phase from the waveform (a) by 90° as shown at waveform (b) in FIG. 20.

The phase-shifted waveform (b) from the phase shifter 110 is supplied to the second horizontal and vertical deflection coils 94 and 96 through a second horizontal and a second vertical driving circuits 112 and 114 respectively. The second driving circuits 112 and 114 are identical to the first driving circuits 102 and 104 respectively and applied with waveforms (c) and (d) from the deflection frequency generator 106 and 108 respectively. Thus the second driving circuits 112 and 114 are operated in the same manner as the first driving circuits 102 and 104 to supply to the second deflection coils 94 and 96 respective waveforms (f) and (h) shown in FIG. 20. From FIG. 20 it is seen that the waveforms (f) and (h) are in quadrature relationship with the waveforms (e) and (g) respectively.

From FIG. 20 it is seen that the second horizontal and vertical deflection coils 94 and 96 respectively do not deflect an electron beam at a starting point expressed by $t=0$. However, at that time, the first horizontal and vertical deflection coils 90 and 92 respectively are operated to cause the electron beam to normally scan an associated picture area by having applied thereto the waveforms (e) and (g) having a maximum amplitude in a positive excursion.

Upon a time point of $t=t_1$ being reached, the first vertical deflection coil 90 has flowing therethrough a saw-toothed current whose amplitude decreases to 0.7 time the amplitude at $t=0$. Similarly the first vertical deflection coil 92 has flowing therethrough a saw-toothed current whose amplitude decreases to 0.7 time the amplutide at $t=0$.

At the time point of $t=t_1$, the second horizontal and vertical deflection coils 94 and 96 respectively have flowing therethrough respective saw-toothed current whose amplitudes is equal to 0.7 times the amplitudes at the succeeding time point of $t=t_2$ as shown at waveforms (g) and (h) in FIG. 20. A time interval between $t=0$ and $t=t_1$ is equal to that between $t=t_1$ and $t=t_2$.

Since the second coils 94 and 96 are disposed in quadrature relationship with the first coils 90 and 92 respectively, those deflection currents at the time point of $t=t_1$ generate a force acting on the electron beam in a direction rotated through an angle of 45° from that at the starting time point of $t=0$. Further at the time point of $t=t_2$, the electron beam is deflected in a direction rotated through an angle of 90° from that at $t=0$.

From the foregoing it is seen that the image can be rotated through incremental angles of 45° by supplying the waveforms (e), (f), (g) and (h) to the four deflection coils respectively.

The arrangement as shown in FIGS. 18 and 19 is advantageous in that, upon reading out an array of bar codes, a uniform video signal is produced and a reading error is decreased. This is because, by applying to the television camera 18 the control signal from the raster control circuit 78, it is possible to prevent each pair of adjacent scanning lines from overlapping each other while the raster is rotated in the incremental manner.

FIG. 21 shows a modification of the arrangement illustrated in FIG. 18. In FIG. 21, a pair of horizontal and vertical deflection coils 90' and 91' respectively are of the conventional construction and provided on the television camera (not shown in FIG. 21) in the manner well known in the art. In this case, each pair of adjacent scanning lines are at least contacted by each other in the same manner as above described in conjunction with FIG. 17 and the incremental rotations of the raster are accomplished by a pulse motor for rotating each of the horizontal vertical deflection coils 90 and 92.

From the foregoing it is appreciated that the present invention provides an information reading system decreased in reading error due to after-images appearing on a television camera involved by at least contacting each pair of adjacent scanning lines with each other and rotating a raster formed in such scanning lines in the incremental manner. With the scanning lines spaced away from one another, a gate circuit may be used to block remove a video signal including a spurious signal originating from after-images left on the television camera. Alternatively such a video signal may be subtracted from the preceding video signal correlative thereto to remove the spurious signal.

While the present invention has been illustrated and described in conjunction with several preferred embodiments thereof it is to be understood that numerous changes and modifications may be resorted to without departing from the spirit and scope of the present invention.

What we claim is:

1. An information reading system comprising a pedestal including a transparent window, a television camera disposed in opposite relationship with said transparent window on said pedestal, said television camera including a focusing coil having an elliptical cross section to form an elliptical scanning beam and an output and having a raster formed of scanning lines produced therein and rotated, signal processing means connected to said output of said television camera to produce a video signal produced by said television camera, and raster control circuit means connected to the television camera for contacting each pair of adjacent scanning lines with each other.

2. An information reading system comprising a pedestal including a transparent window, a television camera disposed in opposite relationship with said transparent window on said pedestal, said television camera including an output and having a raster formed of scanning lines produced therein and rotated, signal processing means connected to said output of said television camera to process a video signal produced by said television camera, and raster control circuit means connected to the television camera for at least contacting each pair of adjacent scanning lines with each other wherein said signal processing means includes a correlation circuit coupled to said output of said television camera to obtain the correlation between a first video signal due to a first scanning line and a second video signal due to that portion of a second scanning line adjacent to said first scanning line, and a data sensor circuit connected to said correlation circuit to process a video signal from said correlation circuit.

3. An information reading system as claimed in claim 2 wherein said first and second video signals due to said first and second scanning lines respectively originate from a common frame.

4. An information reading system as claimed in claim 2 wherein said raster control circuit is further operative to rotate said raster in the incremental manner.

5. An information reading system as claimed in claim 2 wherein said first and second video signals due to said first and second scanning lines respectively originate from different frames respectively.

6. An information reading system comprising a pedestal including a transparent window, a television camera disposed in opposite relationship with said transparent window on said pedestal, said television camera including an output and having a raster formed of scanning lines produced therein and rotated, signal processing means connected to said output of said television camera to process a video signal produced by said television camera, and raster control circuit means connected to the television camera for at least contacting each pair of adjacent scanning lines with each other, and a beam control circuit connected to said television camera to rotate said raster, and to cause said television camera to produce first scanning beams alternate second scanning beams greater in width than said first scanning beams, and wherein said signal processing means processes a video signals caused from said first scanning beam.

7. An information reading system as claimed in claim 6 wherein said raster is composed of a first raster portion formed of said first scanning beams and a second raster portion formed of said second scanning beams.

8. An information reading system as claimed in claim 6 wherein said raster is formed of said first and second scanning beams.

* * * * *